(12) United States Patent
Helmke

(10) Patent No.: US 7,420,949 B2
(45) Date of Patent: Sep. 2, 2008

(54) METHOD OF, AND SYSTEM FOR, RESERVING TIMESLOTS IN A TDMA SYSTEM

(75) Inventor: Holger Helmke, Schwoikheim (DE)

(73) Assignee: Ericsson AB, Stockholm (SE)

( * ) Notice: Subject to any disclaimer, the term of this patent is extended or adjusted under 35 U.S.C. 154(b) by 567 days.

(21) Appl. No.: 10/477,670

(22) PCT Filed: May 14, 2002

(86) PCT No.: PCT/IB02/02795

§ 371 (c)(1),
(2), (4) Date: Jun. 7, 2004

(87) PCT Pub. No.: WO02/093950

PCT Pub. Date: Nov. 21, 2002

(65) Prior Publication Data

US 2004/0233885 A1 Nov. 25, 2004

(30) Foreign Application Priority Data

May 14, 2001 (DE) ................................ 101 23 311

(51) Int. Cl.
*H04J 3/00* (2006.01)
*H04B 7/216* (2006.01)
(52) U.S. Cl. ....................................... 370/337; 370/347
(58) Field of Classification Search ................. 370/335, 370/337, 342, 347, 441, 442; 375/140, 145
See application file for complete search history.

(56) References Cited

U.S. PATENT DOCUMENTS

| 5,267,271 A | | 11/1993 | Rice |
| 5,677,928 A | * | 10/1997 | Rizzo et al. .................. 375/134 |
| 5,729,541 A | * | 3/1998 | Hamalainen et al. ......... 370/337 |
| 5,960,032 A | * | 9/1999 | Letaief et al. ................ 375/146 |
| 6,163,533 A | | 12/2000 | Esmailzadch et al. |
| 6,216,004 B1 | | 4/2001 | Tiedemann, Jr. et al. |
| 7,173,919 B1 | * | 2/2007 | Dabak .......................... 370/335 |

FOREIGN PATENT DOCUMENTS

WO WO 01/11823 A2 2/2001

* cited by examiner

*Primary Examiner*—Lee Nguyen
(74) *Attorney, Agent, or Firm*—Kirschstein et al.

(57) ABSTRACT

A method of, and system for, reserving timeslots in a TDMA system of a type in which a plurality of subscriber units (CPE) use the same radio channel for transmission during different timeslots to a base station and in which the base station administers the radio channel centrally enable subscriber units to transfer, if appropriate, a transmission request to the base station in the form of a PN (Pseudo-random noise) sequence (e.g., M-sequence, preferred gold, Katsami or orthogonal gold sequence). Transmission requests from different subscriber units can be identified at the base station using the PN sequence, reception time of the PN sequence and/or phase of the PN sequence.

26 Claims, 7 Drawing Sheets

METHOD OF, AND SYSTEM FOR, RESERVING TIMESLOTS IN A TDMA SYSTEM

The present invention relates to a method of, and system for, reserving timeslots in a TDMA (time-division multiple access) system, in which a plurality of subscriber units use the same radio channel for transmission during different timeslots, and a base station administers the radio channel centrally.

Systems of the generic type and methods of the generic type are used in TDMA systems, in particular TDMA point-to-multipoint radio systems (PMP), to assign a subscriber unit ((CPE) customer premises equipment) a chronologically limited range of a radio channel for transmission. In TDMA multipoint systems, a plurality of subscribers use the same radio channel for transmission in chronological succession in the uplink, that is to say when transmitting from the subscriber unit to the base station. Since data is transmitted in a burst-like fashion, it is particularly inefficient to transmit small data quantities, for example a reservation request alone, as a preamble or a midamble is almost always necessary for synchronization in the receiver when the data is transmitted. The actual transmitted information, that is to say for example the reservation request, then takes up only a small portion of the total amount of data transmitted so that when a small number of bits is transmitted in this way the spectral efficiency is particularly low.

The base station which administers the radio channel centrally assigns a subscriber a timeslot for transmission in the uplink, via a collision-free downlink when necessary.

As the time of a new request for a transmission timeslot cannot generally be predicted, it has already been proposed to perform a fixed assignment of timeslots so that each subscriber unit has the possibility, at specific time intervals, of transmitting a reservation request to the base station in the uplink. However, a fixed assignment of timeslots utilizes the transmission channel inefficiently as there will be a large number of permanently allocated timeslots in which the subscriber units do not output a reservation request.

In addition to the fixed assignment of timeslots, it has also been proposed to interrogate the subscriber units at regular intervals. This method is termed polling. If a subscriber unit is polled, a timeslot is allocated to it in which it can transmit data, that is to say both reservation requests and subscriber data. However, in order to achieve a short transmission delay, the subscriber units must be interrogated very frequently so that polling is also wasteful of transmission capacity.

It is also known to assign timeslots on the basis of what are referred to as random access timeslots. These are timeslots which are not assigned permanently to a subscriber unit. Instead, a plurality of subscribers can dispatch a reservation request in the timeslot when necessary. However, it is disadvantageous that data is lost when there is multiple access to the random access timeslot, that is to say when there is a collision. In the case of a collision, the subscriber units must transmit again later. However, because the possibility of collisions repeatedly occurring is not excluded, long transmission delays are possible in a system using random access timeslots. In order to limit these transmission delays it has been proposed, after a collision occurs, to increase the number of random access timeslots and/or restrict the number of transmission-authorized subscriber units. However, this has the disadvantage that when there are small transmission delays such a method for resolving collisions leads to wastage of the transmission bandwidth.

According to the present invention there is provided a method of reserving timeslots in a TDMA system comprising a plurality of subscriber units (CPE) that use the same radio channel for transmission during different timeslots to a base station, and in which the base station administers the radio channel centrally, which is characterized by: if appropriate, the subscriber units transferring a transmission request to the base station in the form of a PN (pseudo- random noise) sequence.

Here, it is, for example, possible to carry out ON/OFF signalling. Detection of the PN sequence of a subscriber unit by the base stations indicates that data is present for transmission in the subscriber unit. If no sequence is detected, this is taken as indicating that the subscriber unit does not request an uplink connection. Since the base station is capable of identifying subscriber units from the PN sequence, this prevents collisions occurring. If a PN sequence is detected, it is possible, for example in the next MAC (medium access control) frame, to allocate a timeslot for the transmission of data. More precise reservation data can then be transmitted with this using a "piggyback" method. It is also possible for a dedicated control timeslot to be allocated in the form of a short burst via which the only information transmitted then is a detailed reservation request. In all cases, it is possible using the method of the invention to keep the time between the subscriber unit dispatching the reservation request in the form of a PN sequence up to the availability of, for example, detailed filling level information in a buffer of a subscriber unit, virtually constant, for example of a length of two time periods of an MAC frame.

The use of PN sequences in data communication has already been successfully implemented in CDMA systems. In CDMA systems, the actual transmission data can be encoded on a subscriber-specific basis with a PN sequence in such a way that the transmission data in the base station can be unambiguously allocated to the subscriber unit. The present invention is to utilize the transmission of PN sequences within the scope of a TDMA system for identifying subscriber units during a reservation request. In this way, transmission resources of the TDMA system are utilized efficiently and transmission delays are reduced.

Preferably, the PN sequence is an M-sequence. M-sequences are conveniently generated from fed-back shift registers with XOR logic operation in the feedback branch. They can be used in different reservation methods.

Advantageously, the PN sequence is a "preferred gold" sequence. This is conveniently obtained by performing an XOR logic operation on two M-sequences which vary in phase with respect to one another.

In a further embodiment, the PN sequence is a "Katsami" sequence. Katsami sequences of different lengths and with different properties are known such that subscriber units can unambiguously be distinguished from one another.

In a further particularly advantageous embodiment, the PN sequence is an orthogonal gold sequence. Such sequences are "preferred gold" sequences which have been lengthened by one element. It is also possible to carry out a selection in respect of the orthogonal gold sequences.

Preferably, the subscriber units transmit at least partially different PN sequences at at least partially different times, and subscriber units are identified using the transmitted PN sequence and the reception time of the PN sequence. In this way, it is possible, for a plurality of subscriber units to use the same PN sequence since the reception time of the PN sequence can be used to unambiguously identify the subscriber unit. Alternatively each subscriber unit can have a unique PN sequence and subscriber units can be identified at the base station from the PN sequence alone.

In a further embodiment, the subscriber units transmit at least partially identical PN sequences at at least partially different times, and subscriber units are identified using the reception time of the PN sequence. Within the scope of this sequence-timing method it is, for example, possible for all the subscriber units to use the same M-sequence, but to broadcast them at staggered times. The identification of subscriber units can then be carried out solely by means of the reception time of the PN sequencers.

In yet a further embodiment, the subscriber units transmit PN sequences at different times and/or with different phases, and subscriber units are identified by using the reception time of the PN sequence and/or the phase. Here too, it is possible for all the subscriber units to use the same PN sequence. Since different subscriber units use partially different times for transmitting the PN sequences it is possible to provide the same phase for a plurality of subscriber units.

In a further advantageous embodiment, the subscriber units transmit PN sequences during the normal transmission operation, wherein the PN sequences lie below the noise level of the normal transmission operation, and the subscriber units are identified using the reception time. The signalling takes place, for example, using a long M-sequence below the noise level in parallel with the normal data transmission. As a result of this the signal-to-noise ratio (SNR) of the normal transmission is degraded, but, by means of suitable assumptions with respect to the accessing subscriber units, it is possible to calculate the level at which the noise power caused by the signalling can lie.

In a particularly preferred embodiment and in the case of the sequence-time method and in the case of the sequence-time-phase method, the transmission times lie within one timeslot. A timeslot is therefore divided into a plurality of sub-timeslots with the result that the time information used by the method to identify subscriber units can be acquired from the identification of the sub-timeslot.

Alternatively, the transmission times can lie within a plurality of timeslots. In such a method the transmitted information can then be encoded so that even small SNR values permit a low error rate to be made available by means of the coding gain.

Furthermore, in the case of the sequence-timing method and in the case of the sequence-level method, a plurality of modulated sequences are transmitted in succession. Coding is thus also possible within the scope of these methods.

According to a second aspect of the invention there is provided a system for reserving timeslots in a TDMA system comprising: a plurality of subscriber units (CPE) that use the same radio channel for transmission during different timeslots to a base station, and in which the base station administers the radio channel centrally, which is characterized by, if appropriate, the subscriber units transferring a transmission request to the base station using a PN (pseudo-random noise) sequence.

In this way, the aforementioned advantages of the method according to the invention are implemented in a system for reserving timeslots.

Advantageously, the PN sequence is an M-sequence.

Preferably, the PN sequence is a "preferred gold" sequence.

In a further embodiment, the PN sequence is a "Katsami" sequence or an orthogonal gold sequence. The various PN sequences mentioned above can provide different advantages depending on the method applied.

Furthermore, the system further comprises the subscriber units transmitting at least partially different PN sequences at at least partially different times, and identifying subscriber units using the transmitted PN sequence and the reception time of the PN sequence.

Alternatively, the subscriber units transmit at least partially identical PN sequences at at least partially different times, and subscriber units are identified using the reception time of the PN sequence.

It is also envisaged that the subscriber units transmit PN sequences at different times and/or with different phases, and for subscriber units to be identified using the reception time of the PN sequence and/or the phase.

In one further advantageous embodiment of the system, the subscriber units transmit PN sequences during the normal transmission operation, wherein the PN sequences lie below the noise level of the normal transmission operation, and subscriber units are identified using the reception time. To optimise the signal-to-noise ratio the PN sequence are advantageously long sequences.

In the case of the sequence-time system and in the case of the sequence-time-phase system, the transmission times advantageously lie within one timeslot. Such a timeslot is divided into a plurality of sub-timeslots so that the time information used to identify subscriber units can be acquired from the identification of the sub-timeslot.

Alternatively, in the case of the sequence-time system and in the case of the sequence-time-phase system, the transmission times advantageously lie within a plurality of timeslots. In this way coding of the information is possible.

In the case of the sequence-timing system and in the case of the sequence-level system, a plurality of modulated sequences are preferably transmitted in succession. In these methods it is thus also possible to encode the information.

The present invention is based on the recognition that it is possible to signal a transmission request to the base station in the form of a pseudo-random noise (PN) sequence, and the base station being capable of detecting and unambiguously identifying the transmitting subscriber unit that has transmitted the PN sequence. A method and a system are thus made available which only require a small amount of transmission resource for making reservation requests, whilst ensuring a short transmission delay. The more efficient use of the channel enables more data to be transmitted, which reduces the transmission costs per bit. The short transmission delay improves the quality of the transmission, for example in the case of voice transmission.

Embodiments of the present invention will now be explained by way of example only with reference to the accompanying drawings, in which.

In order that the invention can be better understood, the basic properties of various PN (pseudo-random noise) sequences will firstly be given in the following table. Here, in each case the sequence length, the number of available sequences, the autocorrelation and the peak-cross-correlation are given for the individual sequence types. Quasi-synchronous timing of the reception sequences in the receiver is a precondition for the indication of autocorrelation and of cross-correlation for the QS(OG-3) sequences, that is to say an offset within ±1.5 symbol for QS(OG-3) and ±0.5 symbol for QS(OG-1). The M-sequences are obtained from fed-back shift registers with XOR logic operation in the feedback branch. The "preferred gold" sequences are obtained by means of an XOR logic operation performed on two M-sequences which vary in phase with respect to one another. QS(OG-1) sequences are orthogonal gold sequences ("preferred gold" sequences which have been lengthened by one element). By means of selection, QS(OG-3) sequences are obtained from the QS(OG-1) sequences.

| Sequence | Length | Number | Autocorrelation | Peak-cross-correlation | |
|---|---|---|---|---|---|
| M-sequence | 31 | 6 | 31/−1 | 11 | |
| M-sequence | 63 | 6 | 63/−1 | 23 | |
| M-sequence | 127 | 18 | 127/−1 | 41 | |
| M-sequence | 255 | 16 | 255/−1 | 95 | |
| M-sequence | 511 | 48 | 511/−1 | 113 | |
| Preferred gold | 31 | 33 | 31/9 | 9 | (29%) |
| Preferred gold | 63 | 65 | 63/17 | 17 | (27%) |
| Preferred gold | 127 | 129 | 127/17 | 17 | (13%) |
| Preferred gold | 255 | 257 | 255/31 | 31 | (12%) |
| Preferred gold | 511 | 513 | 511/33 | 33 | (6%) |
| Preferred gold | 1023 | 1023 | 1023/65 | 65 | (6%) |
| Katsami sequence | 63 | 8 | 63/9 | 9 | (14%) |
| Katsami sequence | 255 | 16 | 255/17 | 17 | (7%) |
| Katsami sequence | 1023 | 32 | 1023/33 | 33 | (3%) |
| 4-QS(OG-1) | 4 | 4 | 4 | 0 | |
| 8-QS(OG-1) | 8 | 8 | 8 | 0 | |
| 16-QS(OG-1) | 16 | 16 | 16 | 0 | |
| 32-QS(OG-1) | 32 | 32 | 32 | 0 | |
| 32-QS(OG-3) | 32 | 8 | 32 | 0 | |
| 64-QS(OG-3) | 64 | 16 | 64 | 0 | |
| 128-QS(OG-3) | 128 | 32 | 128 | 0 | |
| 256-QS(OG-3) | 256 | 64 | 256 | 0 | |
| 512-QS(OG-3) | 512 | 128 | 512 | 0 | |
| 1024-QS(OG-3) | 1024 | 256 | 1024 | 0 | |

The different methods that will be described below are subject to peripheral conditions which have been assumed by way of example to be as follows:

| | |
|---|---|
| active CPEs in one sector: | maximum of 256 |
| symbol rate (uplink): | 12.6 M-symbols/s |
| MAC frame length: | 1 ms (=12600 symbols) |
| SNR in the receiver: | approx. 5 dB |

In addition, it has been assumed that for the exemplary description of the various methods eight simultaneous reservation requests have been made.

Figure 1:
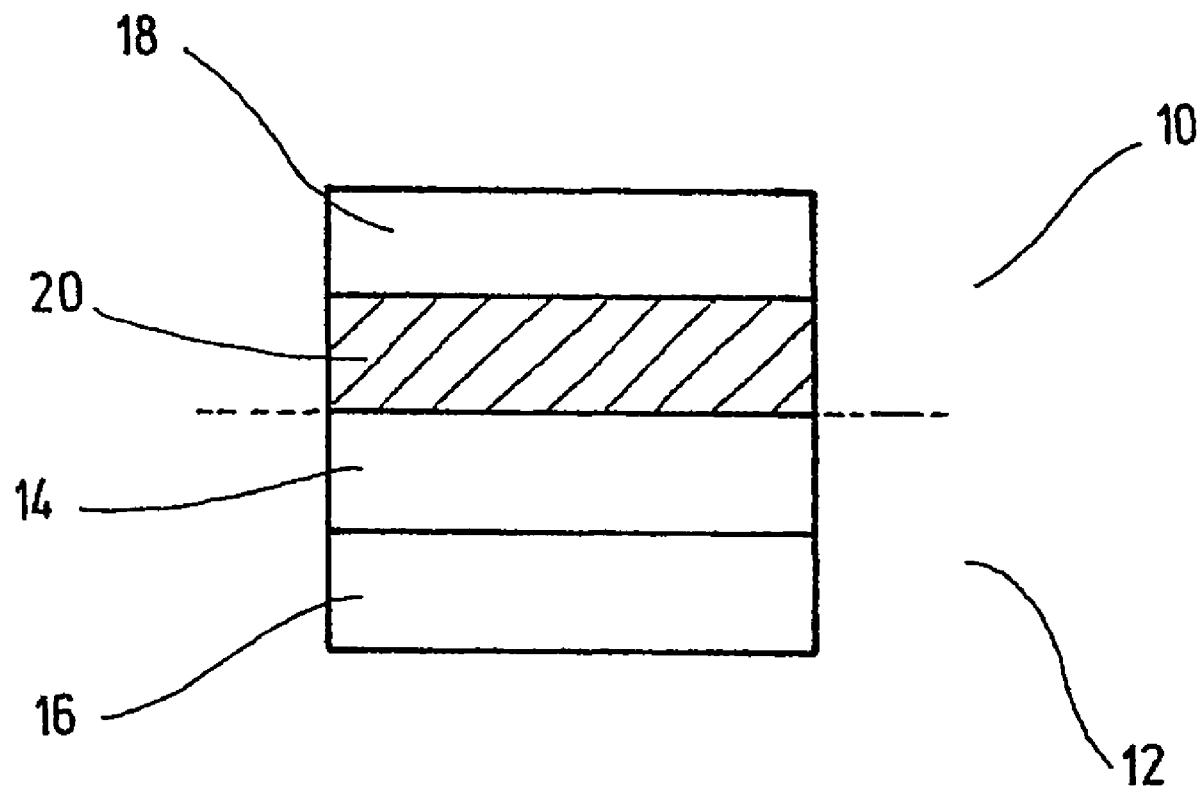
FIG. 1 shows a schematic view of an ISO OSI model for classifying the present invention within an entire communications system.

FIG. 1 shows an overview of an ISO OSI model in order to be able to classify the present invention within the entire system. The ISO OSI model comprises a data link layer 10 and a physical layer 12. The physical layer 12 is divided into two layers, specifically a physical layer convergence protocol (PLCP) 14 and into a physical medium dependent (PND) layer 16. The data link layer 10 is also divided into two layers, specifically into a logic link control 18 (LLC) and into a layer for medium access control 20 (medium access control layer; MAC layer). The methods and systems described within the scope of the present invention are to be assigned to the MAC layer 20 within the entire system illustrated in FIG. 1.

The sequence of a plurality of MAC frames is represented in tabular form below:

| 12600 symbols MAC frame N | 12600 symbols MAC frame N + 1 | 12600 symbols MAC frame N + 2 | 12600 symbols MAC frame N + 3 |
|---|---|---|---|
| 1 ms | 1 ms | 1 ms | 1 ms |

Figure 2:
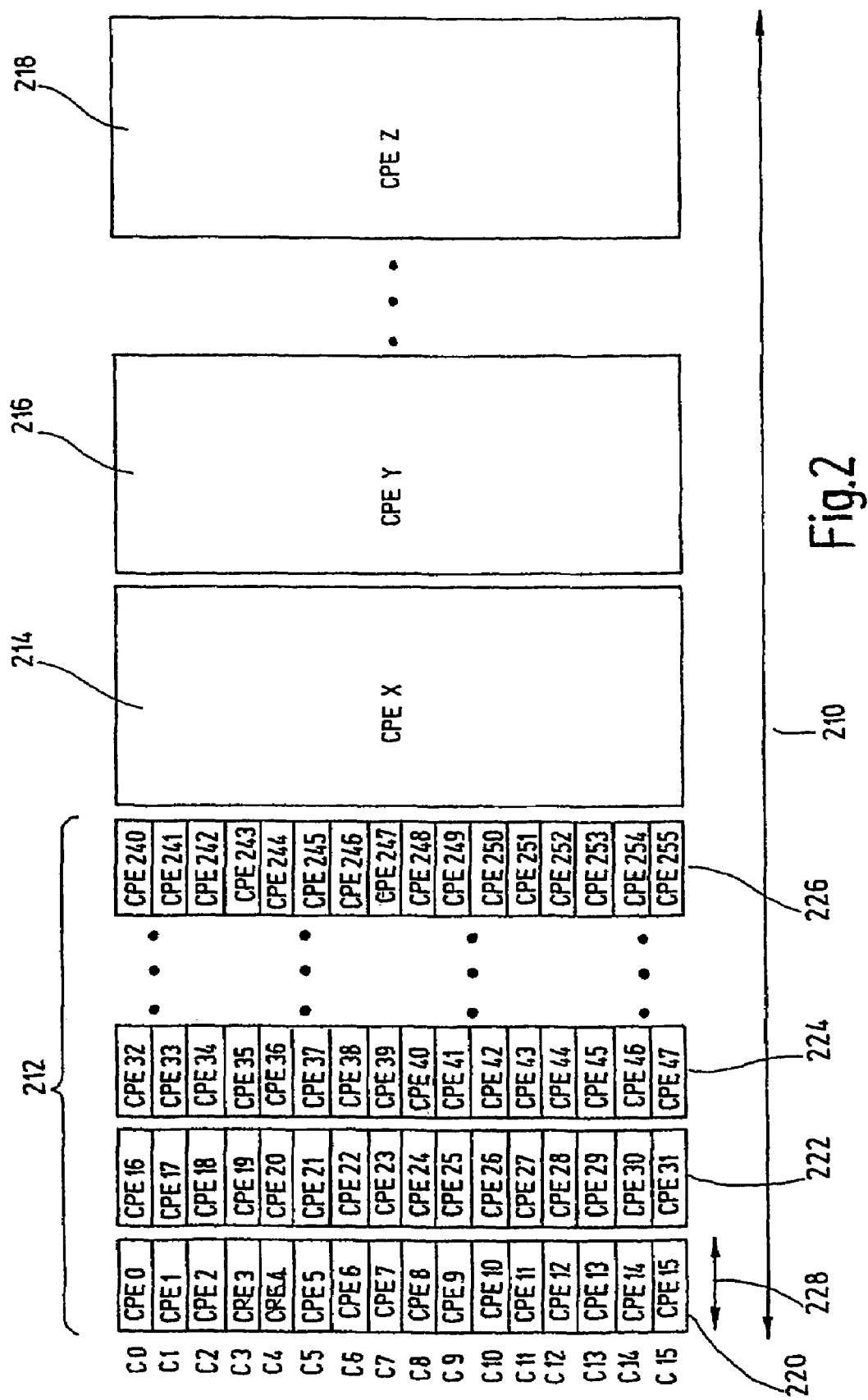
FIG. 2 shows an MAC frame with 64-QS(OG-3) sequences in order to clarify a sequence-time method or a sequence-time system according to the present invention.

FIG. 2 shows a MAC frame with 64-QS(OG-3) sequences in order to illustrate a sequence-time method or a sequence-time system according to the present invention. Examples of sequences which can be used within the scope of the sequence-time method and their properties and their effect on the transmission are represented in the following table.

| Sequence | Sequence number | Timeslot (overall length) | SNR | Computational work per MAC frame |
|---|---|---|---|---|
| 1024-QS(OG-3) | 256 | 1030 | 35 dB | 256 * 1024 * 5 |
| 512-QS(OG-3) | 128 | 1033 | 32 dB | 2 * 128 * 512 * 5 |
| 256-QS(OG-3) | 64 | 1039 | 29 dB | 4 * 64 * 256 * 5 |
| 128-QS(OG-3) | 32 | 1051 | 26 dB | 8 * 32 * 128 * 5 |
| 64-QS(OG-3) | 16 | 1075 | 23 dB | 16 * 16 * 64 * 5 |
| 32-QS(OG-3) | 8 | 1123 | 20 dB | 32 * 8 * 32 * 5 |
| 16-QS(OG-3) | 4 | 1219 | 17 dB | 64 * 4 * 16 * 5 |
| 8-QS(OG-3) | 2 | 1411 | 14 dB | 128 * 2 * 8 * 5 |

FIG. 2 illustrates a MAC frame 210 which is divided into a plurality of timeslots 212, 214, 216, . . . , 218. The timeslots 214, 216, . . . , 218, of which three are illustrated in FIG. 2, are used for "normal" data transmission. The timeslot 212 makes available 256 subscriber units CPE 0, CPE 1, . . . , CPE 255 for dispatching reservation requests. For this purpose, the timeslot 212 is divided into 16 sub-timeslots 220, 222, 224, . . . , 226, of which four are represented in FIG. 2. Each of the sub-timeslots 220, 222, 224, . . . , 226 has a length 228 of 16 symbols. Within an individual sub-timeslot, the subscriber units 16 are assigned different codes C 0, C 1, C 2, . . . C 15. For example, the subscriber units CPE 0, CPE 16, CPE 32, . . . , CPE 240 are assigned the code C 0. The subscriber units are, however, distinguishable from one another when the code C 0 is received by the base station because each of the subscriber units CPE 0, CPE 16, CPE 32, . . . , CPE 240 is assigned to a different sub-timeslot 220, 222, 224, . . . , 226. Another code, for example the code C 11 is assigned to the other subscriber units, for example the subscriber units CPE 11, CPE 27, CPE 43, . . . , CPE 251.

The high SNR values given in the table above result from the favourable cross-correlation function of the respective sequences.

In contrast to the illustration in FIG. 2, it would, for example, also be possible to operate with a 256-QS(OG-1) code with in each case one sequence for the 256 subscriber units. The timeslot length would then be a total of only 256 symbols. However, with a reception inaccuracy of ±1 symbol severe SNR degradation is then possible under unfavourable conditions. To remedy this, the reception inaccuracy could then be reduced to ±0.5 symbol.

Figure 3:
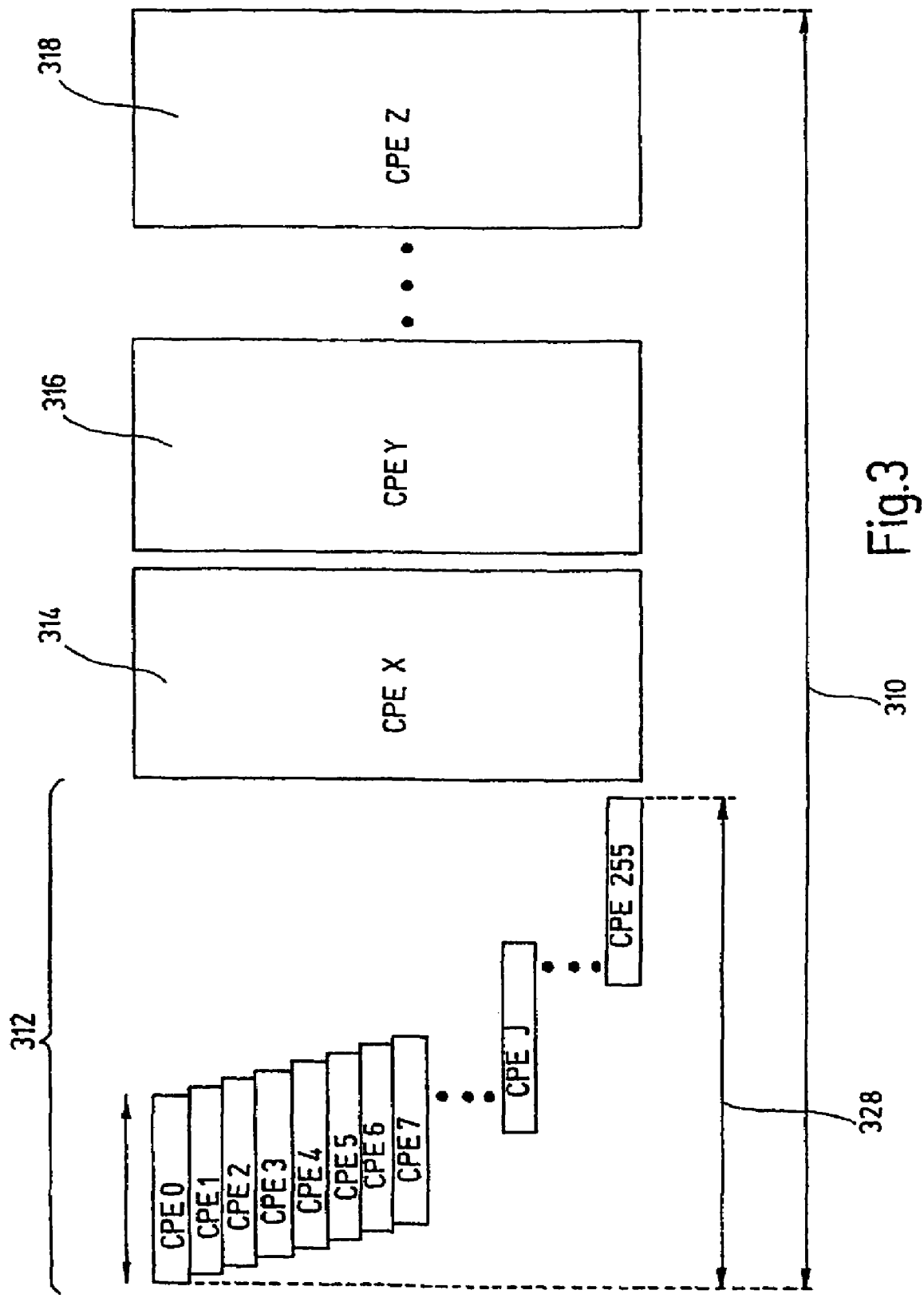
FIG. 3 shows an MAC frame with a 127-M-sequence in order to clarify a sequence-timing method or a sequence-timing system according to the present invention.

FIG. 3 shows an MAC frame with a 127-M-sequence in order to illustrate a sequence-timing method or a sequence-timing system according to the present invention. Here, all the subscriber units use the same M-sequence. The identification of the respective subscriber unit is carried out in the receiver using the reception time.

In the following table, possible M-sequences to be used, and their properties and effects on the system, are given. In the SNR calculation it has been assumed that the autocorrelation function of the sequence used is always −1 beyond the maximum. This applies to periodically propagated M-sequences. However, as the M-sequences are not periodically propagated here, when there is overlap of a plurality of sequences a smaller SNR is obtained. In order to counteract this, it is possible to use more suitable sequences.

| Sequence | Sequence number | Timeslot (overall length) | SNR | Computational work per MAC frame |
|---|---|---|---|---|
| 1023-M-sequence | 1 | 1023 + 3 * 255 | 21.5 dB | 256 * 1023 * 5 |
| 511-M-sequence | 1 | 511 + 3 * 255 | 18.5 dB | 256 * 511 * 5 |
| 255-M-sequence | 1 | 255 + 3 * 255 | 15.5 dB | 256 * 255 * 5 |
| 127-M-sequence | 1 | 127 + 3 * 255 | 12.5 dB | 256 * 127 * 5 |
| 63-M-sequence | 1 | 63 + 3 * 255 | 9.5 dB | 256 * 63 * 5 |

The MAC frame 310 is divided into a plurality of timeslots 312, 314, 316, ..., 318. Here, the timeslots 314, 316, ..., 318, of which three are illustrated, are provided for the normal data transmission. The timeslot 312 is used to transfer reservation requests from 255 subscriber units CPE 0, CPE 1, CPE 2, ..., CPE 255. The sequence used is a 127-M-sequence so that the timeslot 312 has a total length 328 of 892 symbols.

Figure 4:
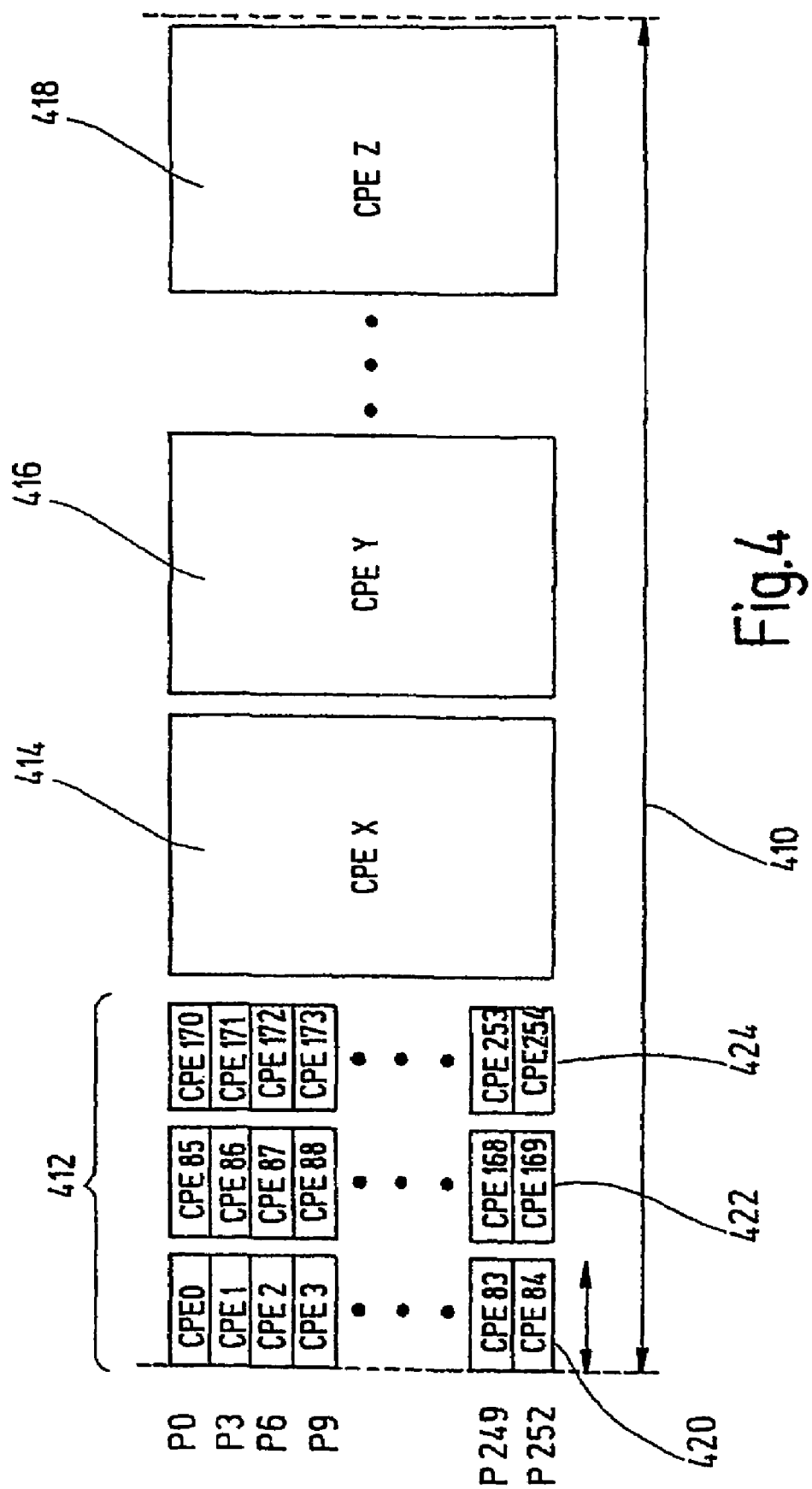
FIG. 4 shows an MAC frame with a 255-M-sequence in order to clarify a sequence-time-phase method or a sequence-time-phase system according to the present invention.

FIG. 4 shows an MAC frame with a 255-M-sequence in order to explain a sequence-time-phase method or a sequence-time-phase system according to the present invention. M-sequences of different phases are transmitted by the various subscriber units. Different times are also used for dispatching the sequences so that this also serves as a distinguishing criterion of the subscriber units.

First, the use of possible sequences will be given by way of example in the following table, their properties and their effects on the entire system also being shown.

| Sequence | Sequence number | Timeslot (overall length) | SNR | Computational work per MAC frame |
|---|---|---|---|---|
| 1023-M-sequence | 341 (341 CPEs) | 1027 | 21.5 dB | 341 * 1023 * 5 |
| 511-M-sequence | 170 (340 CPEs) | 1031 | 18.5 dB | 340 * 511 * 5 |
| 255-M-sequence | 85 (255 CPEs) | 785 | 15.5 dB | 255 * 255 * 5 |
| 127-M-sequence | 42 (252 CPEs) | 783 | 12.5 dB | 252 * 127 * 5 |
| 63-M-sequence | 21 (252 CPEs) | 795 | 9.5 dB | 252 * 63 * 5 |

If the reception time can fluctuate by more than ±1 symbol, the number of phases which can be used is reduced so that fewer subscriber units can transmit within one timeslot. If there is uncertainty of ±4 symbols, only 28 subscriber units can then be used in a timeslot of length 263 symbols.

The MAC frame 410 illustrated in FIG. 4 is divided into a plurality of timeslots 412, 414, 416, ..., 418. The timeslots 414, 416, ..., 418, of which three are represented by way of example, are used for the normal data transmission. The timeslot 412 is used to dispatch reservation requests. The timeslot 412 is divided into three sub-timeslots 420, 422, 424, 255 subscriber units CPE 0, CPE 1, CPE 2, ..., CPE 254 are accommodated in the three sub-timeslots 420, 422, 424. The subscriber units which are represented in a same row in FIG. 4, that is to say for example the subscriber units CPE 2, CPE 87 and CPE 172, use the same phase P6. Subscriber units which are represented in different columns in FIG. 4 use different phases, only every third phase being used owing to the uncertainty of the reception time of ±1 symbol.

The method illustrated in FIG. 4 is of interest for collision-free reservation. Given 85 active subscriber units, only one timeslot of the length 255 (plus the guard time) is necessary with a 255-M-sequence. Given 8 simultaneous access operations, the SNR is then still 15.5 dB with a detection error rate which is less than $2 \sim 10^{-5}$. Given four simultaneous access operations, the detection error rate drops to $10^{-10}$.

Figure 5:
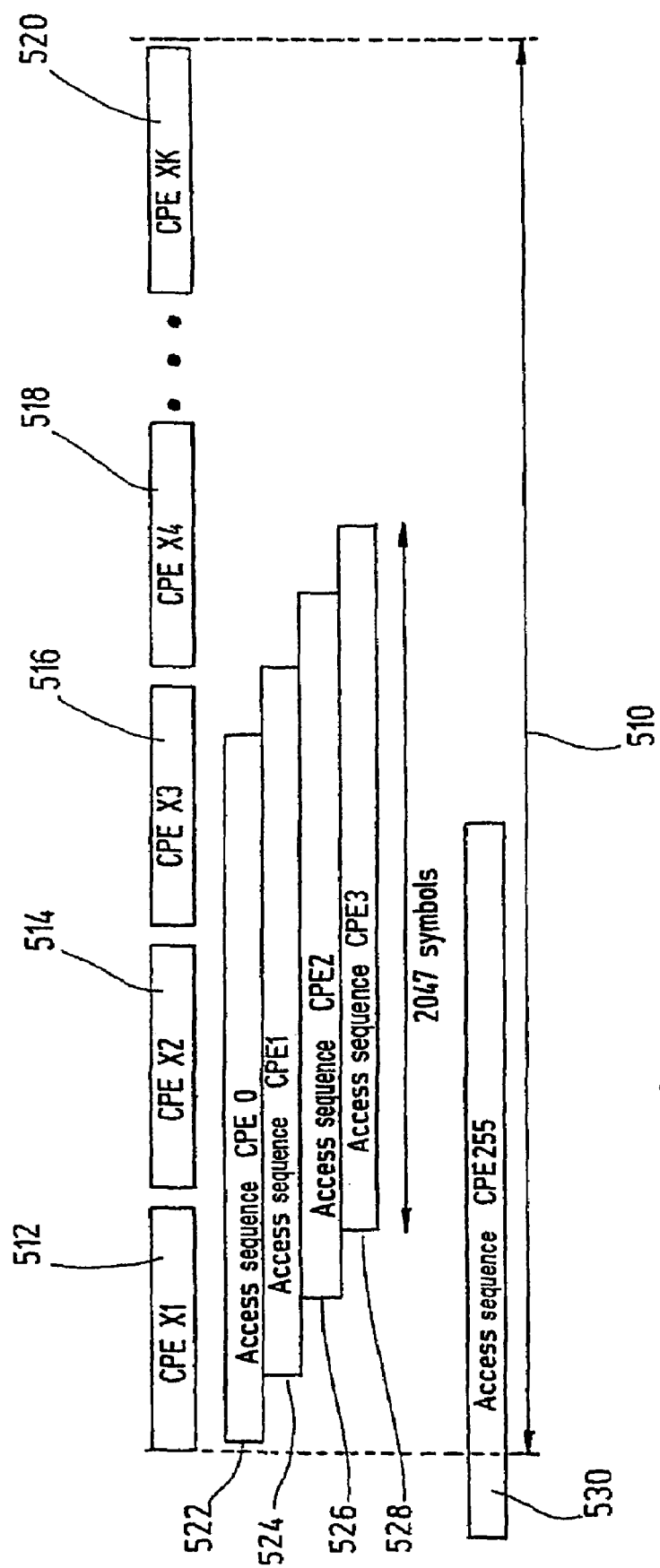
FIG. 5 shows an MAC frame with M-sequences in order to clarify a sequence-level method or a sequence-level system according to the present invention.

FIG. 5 shows an MAC frame with M-sequences in order to explain a sequence-level method or a sequence-level system according to the invention. Signalling is preferably carried out in parallel to the normal data transmission using a long M-sequence that is below the noise level. The identification of the subscriber unit is carried out on the basis of the time of the access. So that each subscriber unit can access once within an MAC frame (12600 symbols), the interval between two sequences must be less than or equal to 49.

Exemplary sequences, their properties and their effects on the entire system are illustrated in the following table.

| Sequence | Sequence overlap | SNR signalling | SNR degradation | Computational work per MAC frame |
|---|---|---|---|---|
| 4095-M-sequence | 84 | 13 dB | 0.5 dB | 256 * 4095 * 5 |
| 4095-M-sequence | 84 | 7 dB | 0.1 dB | 256 * 4095 * 5 |
| 2047-M-sequence | 42 | 10 dB | 0.5 dB | 256 * 2047 * 5 |
| 1023-M-sequence | 21 | 7 dB | 0.5 dB | 256 * 1023 * 5 |
| 511-M-sequence | 11 | 4 dB | 0.5 dB | 256 * 511 * 5 |

A MAC frame 510 is shown in FIG. 2 which is divided into a plurality of timeslots 512, 514, 516, 518, ..., 520, five timeslots being represented by way of example. Normal data transmission takes place during the timeslots 512, 514, 516, 518, ..., 520, in which case, for example, the timeslot 512 is assigned to the subscriber unit CPE X1 and the timeslot 516 is assigned to the subscriber unit CPE X3. In parallel with the normal data transmission, reservation requests are dispatched in the form of access sequences 522, 524, 526, 528, 530, of which five are represented by way of example in FIG. 5. Each of the access sequences has a length of 2047 symbols in the example.

Figure 6:
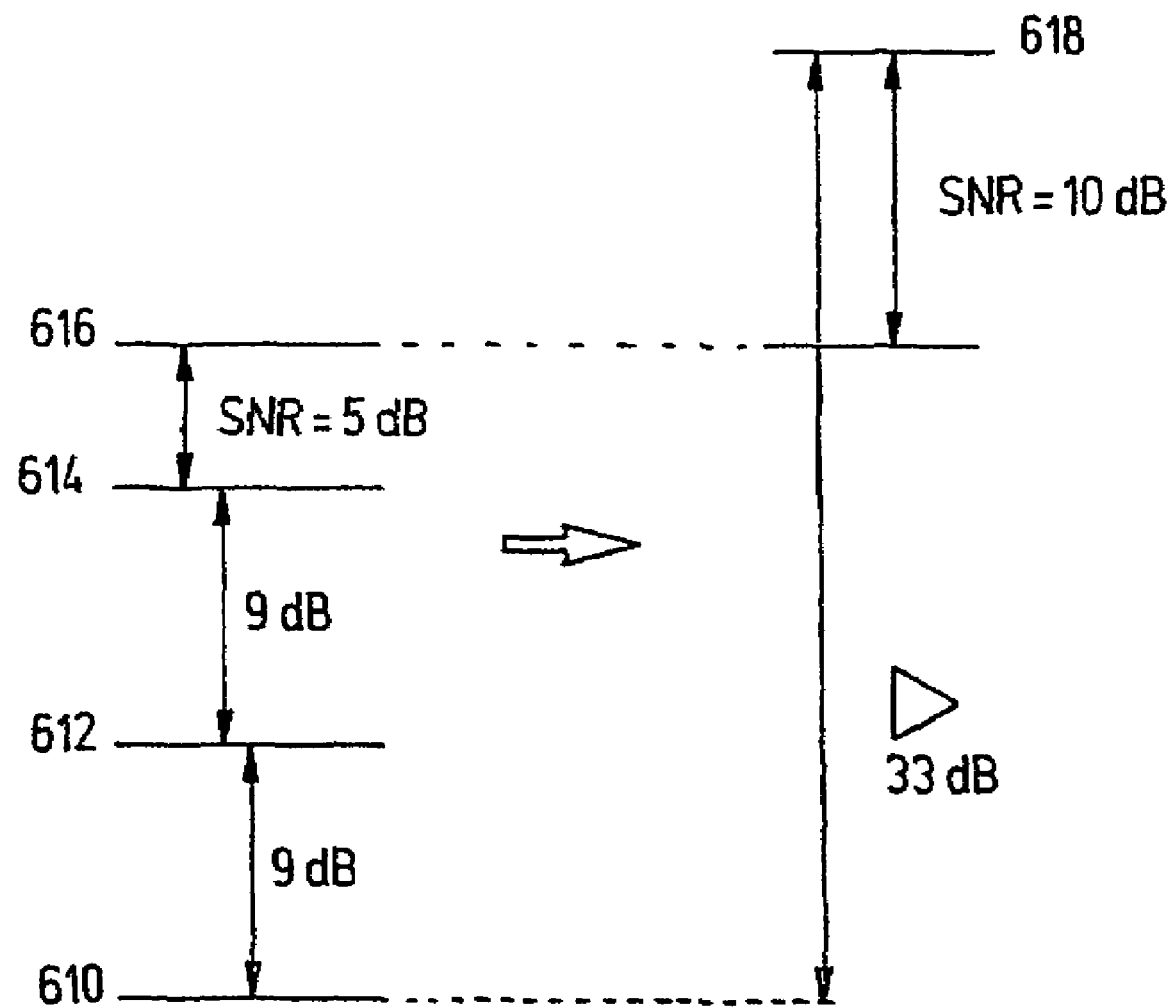
FIG. 6 shows level diagrams in order to clarify a signal-level method or a signal-level system according to the present invention.

In FIG. 6, signal levels are shown which occur in conjunction with an exemplary method using a 2047-M-sequence, the left-hand side of the illustration showing signal levels before despreading and the right-hand side showing signal levels after despreading. The level 610 shows an access signal level for a subscriber unit. Level 612 corresponds to 8 subscriber units. The level 612 is still 9 dB below the normal noise level 614, it being assumed for the transmission burst that it has, with respect to the normal noise level 614, a level 616 with an SNR of 5 dB. After despreading, in which a despreading gain of 33 dB is assumed, an SNR of 10 dB is present with respect to the level 618 of the access signalling.

During the calculation of the SNR degradation, the most unfavourable combination of subscriber units in the access operations was assumed, that is to say it was assumed that there were successive access operations. However, as in all the exemplary embodiments described above, a maximum of 8 access operations is assumed during an MAC frame. For an SNR degradation of 0.5 dB, the noise power caused by signalling must be 9 dB below the normal noise level.

It is to be noted that within the scope of the signal-level method and the signal-level system it is possible to achieve a small detection error probability, preferably with long sequences.

The degradation and necessary countermeasures are illustrated in a table below for different paths for multi-path propagation for the methods described above.

| Method | Strong short-range echoes | Strong long-range echoes | Weak echoes |
|---|---|---|---|
| Sequence-time method | High | high | small |
| Sequence-timing method | medium-sized/ relatively large intervals | medium-sized | small |
| Sequence-time-phase method | medium-sized amount/relatively few phases | medium-sized | small |
| Sequence-level method | Small | small | small |

With the exception of the sequence-level method, all the methods react to strong echoes in a sensitive way. With adaptive receivers, partial or complete compensation of multi-path propagation is possible with a good SNR.

Furthermore, it should also be noted that given a known phase shift or amplitude change between the transmitter and receiver, for example, as a result of repeated transmission, the transmitter can modulate the phase or the amplitude with information. It is then also possible to use relatively high modulation types (QPSK, N-PSK, N-QAM, etc.). As a result, additional information can be transmitted or the transmission can be protected by coding.

Figure 7:
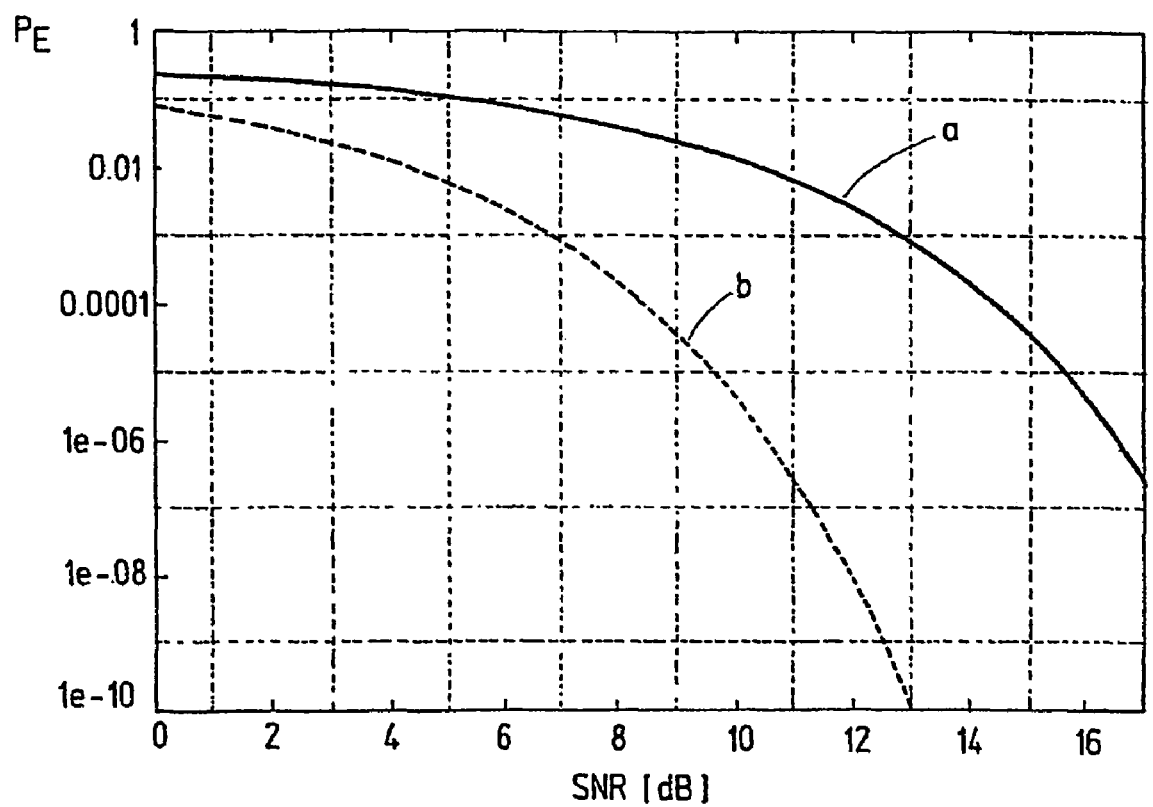
FIG. 7 shows a diagram representing error probabilities as a function of the signal-to-noise ratio for binary signals.

FIG. 7 shows a diagram representing error probabilities as a function of the signal-to-noise ratio for binary signals. Given an identical probability of occurrence of a reservation request or of the absence of a reservation request, the probability of error detection is obtained in accordance with FIG. 7. For a high detection probability, large SNR values are necessary, for example 13 dB for $10^{-3}$ detection errors. These values apply to ON/OFF signalling, as is represented by curve 'a'. If antipodal levels are used for the transmission of a bit, an error curve which is better by 6 dB is obtained, as is illustrated in FIG. 7 by the curve designated by 'b'. However, in order to realize this, reference values (amplitude/phase) must be present.

The above description of the exemplary embodiments according to the present invention serves only for illustrative purposes and not for the purpose of restricting the invention. Various changes and modifications are possible within the framework of the invention without departing from the scope of the invention or its equivalents.

The invention claimed is:

1. A method of reserving timeslots in a time division multiple access system having a plurality of subscriber units that use a same radio channel for transmission during different timeslots to a base station, and in which the base station administers the radio channel centrally, comprising the steps of: transferring transmission requests by the subscriber units, in timeslots assigned by the base station, to the base station in a form of pseudo-random noise (PN) sequences; transmitting the PN sequences by the subscriber units at different times; and identifying the subscriber units using reception times of the PN sequences.

2. The method according to claim 1, in which each PN sequence is an M-sequence.

3. The method according to claim 1, in which each PN sequence is a preferred gold sequence.

4. The method according to claim 1, in which each PN sequence is a Katsami sequence.

5. The method according to claim 1, in which each PN sequence is an orthogonal gold sequence.

6. The method according to claim 1, in which the PN sequences are at least partially different.

7. The method according to claim 1, in which the PN sequences are at least partially identical.

8. The method according to claim 1, and further comprising the steps of: the subscriber units transmitting the PN sequences with different phases, and identifying the subscriber units using a phase of each PN sequence.

9. The method according to claim 8, in which for the sequence-time steps and for the sequence-time-phase steps, the transmission times lie within one timeslot.

10. The method according to claim 8, in which for the sequence-time steps and for the sequence-time-phase steps, the transmission times lie within a plurality of the timeslots.

11. The method according to claim 1, and further comprising the steps of: the subscriber units transmitting the PN sequences during normal transmission operation, wherein the PN sequences lie below a noise level of the normal transmission operation.

12. The method according to claim 11, in which for the sequence-time steps and for the sequence-level steps, a plurality of modulated sequences is transmitted in succession.

13. A subscriber unit for use in a communication system adapted to operate in accordance with the method of claim 1.

14. A base station for use in a communication system adapted to operate in accordance with the method of claim 1.

15. A system for reserving timeslots in a time division multiple access system having a plurality of subscriber units that use a same radio channel for transmission during different timeslots to a base station, and in which the base station administers the radio channel centrally, comprising: the subscriber units being operative to transfer transmission requests, in timeslots assigned by the base station, to the base station in a form of pseudo-random noise (PN) sequences; the subscriber units being further operative to transmit the PN sequences at different times; and the base station being operative to identify the subscriber units using reception times of the PN sequences.

16. The system according to claim 15, in which each PN sequence is an M-sequence.

17. The system according to claim 15, in which each PN sequence is a preferred gold sequence.

18. The system according to claim 15, in which each PN sequence is a Katsami sequence.

19. The system according to claim 15, in which each PN sequence is an orthogonal gold sequence.

20. The system according to claim 15, in which the PN sequences are at least partially different.

21. The system according to claim 15, in which the PN sequences are at least partially identical.

22. The system according to claim 15, wherein the subscriber units transmit the PN sequences with different phases, and identify the subscriber units using a phase of each PN sequence.

23. The system according to claim 22, in which for the sequence-time systems and for the sequence-time-phase system, the transmission times lie within one timeslot.

24. The system according to claim 22, in which for the sequence-time system and for the sequence-time-phase system, the transmission times lie within a plurality of the timeslots.

25. The system according to claim 15, wherein the subscriber units transmit the PN sequences during normal transmission operation, and wherein the PN sequences lie below a noise level of the normal transmission operation.

26. The system according to claim 25, in which for the sequence-time system and for the sequence-level system, a plurality of modulated sequences is transmitted in succession.

* * * * *